United States Patent
Hammerschmidt

(10) Patent No.: US 9,903,779 B2
(45) Date of Patent: Feb. 27, 2018

(54) SENSOR NETWORK SUPPORTING SELF-CALIBRATION OF PRESSURE SENSORS

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 413 days.

(21) Appl. No.: 14/617,399

(22) Filed: Feb. 9, 2015

(65) Prior Publication Data

US 2016/0231192 A1 Aug. 11, 2016

(51) Int. Cl.
*G01L 27/00* (2006.01)
*G01L 9/00* (2006.01)

(52) U.S. Cl.
CPC .......... *G01L 27/005* (2013.01); *G01L 9/0072* (2013.01)

(58) Field of Classification Search
CPC ...................................................... G01L 27/00
See application file for complete search history.

(56) References Cited

U.S. PATENT DOCUMENTS

| | | | | |
|---|---|---|---|---|
| 3,295,360 A | * | 1/1967 | Dimeff | G01L 9/0013 73/24.01 |
| 5,295,395 A | * | 3/1994 | Hocker | H01L 21/2007 257/E21.122 |
| 7,017,418 B1 | * | 3/2006 | Thakre | G01L 9/0008 73/716 |
| 2012/0074972 A1 | | 3/2012 | Rasbornig et al. | |
| 2013/0118265 A1 | * | 5/2013 | Besling | G01L 9/0042 73/724 |

FOREIGN PATENT DOCUMENTS

WO 2009083328 A1 7/2009

OTHER PUBLICATIONS

Robert Puers, et al.; "A Novel Combined Redundant Pressure Sensor with Self-Test Function"; Sensors and Actuators A 60, 1997; p. 68-71.
Adrianna Cozma, et al.; "Electrostatic Actuation as a Self-Testing Method for Silicon Pressure Sensors"; Sensors and Actuators, A 60, 1997; p. 32-36.
Dirk Weiler; "Selbsttest und Fehlertoleranz mit sugelassener milder Degradation in Integrierten CMOS-Sensorsystemen"; Doctoral Dissertation Accepted by: University of Duisburg, Department of Electrical Engineering; Jun. 7, 2001; p. 1-3.

* cited by examiner

*Primary Examiner* — Robert R Raevis
(74) *Attorney, Agent, or Firm* — Eschweiler & Potashnik, LLC

(57) ABSTRACT

A pressure sensor system comprises one or more self-calibrating pressure sensors for self-calibrating sensor parameters based on a membrane deflection or a membrane displacement from an electrostatic force and a single reference pressure from an additional sensor. The additional sensor has a greater accuracy level or range than the self-calibrating sensor. Sensor parameters are derived from capacitance measurements and a single pressure measurement, which are utilized for self-calibration to one or more target values.

24 Claims, 6 Drawing Sheets

SENSOR NETWORK SUPPORTING SELF-CALIBRATION OF PRESSURE SENSORS

FIELD

The present disclosure is in the field of pressure sensors, and more specifically, a sensor network supporting self-calibration of pressures sensors.

BACKGROUND

A capacitive pressure sensor uses a moveable diaphragm and a pressure cavity to create a variable capacitor. The variable capacitor exhibits a capacitance that varies in correspondence to forces introduced by the measured pressure. For the integration of the sensor cells into electronics or systems, such as automotive systems, the sensor cells are often connected to form arrays or bridges; however, from a system point of view those cell networks still act like a single sensor. Sensors are calibrated initially at the end of a fabrication process or line, usually under defined measurement conditions. The calibration and further re-calibration can comprise various different pressures at different temperatures, which may utilize specialized test equipment and significant testing times.

DETAILED DESCRIPTION

Figure 1:
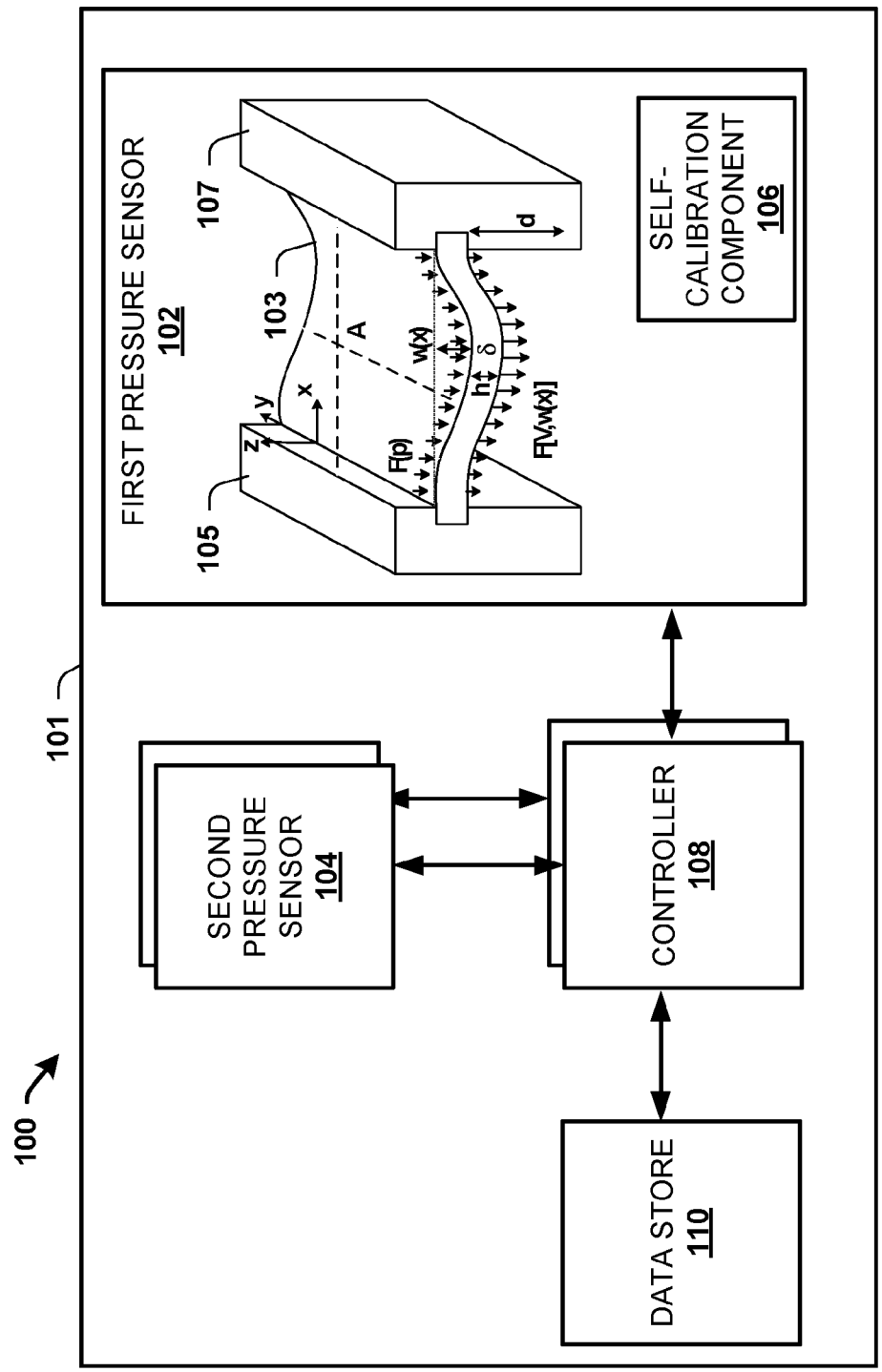
FIG. 1 is a block diagram illustrating a pressure sensor system for self-calibration of a pressure sensor according to various aspects described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer with a processing device. By way of illustration, an application running on a server and the server can also be a component. One or more components can reside within a process, and a component can be localized on one computer and/or distributed between two or more computers.

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Overview

In consideration of the above described deficiencies, various aspects for supporting a self-calibration operation of one or more pressure sensors are described, such as for micro electromechanical system (MEMS) pressure sensors or other pressure sensors that are communicatively coupled to a vehicle controller or other system controller. A pressure sensor system is described for supporting self-calibration of pressure sensors that can be stimulated by an electrostatic force overlaying a deflection caused by a resulting pressure at a diaphragm or membrane. The system further enables self-extraction of pressure sensor parameter values for a self-calibration by a pressure sensor itself according to one or more target values and based on a pressure (e.g., an ambient pressure) derived from or received by an additional sensor. For example, at least one sensor communicates sensor data of an ambient pressure from which a pressure measurement can be determined. The self-calibrating pressure sensor receives the sensor data and performs a self-calibration operation for sensor parameters to obtain a target value with the pressure information from the received sensor data. In one aspect, the self-calibrating pressure sensor receiving the sensor data operates to detect pressure within the system to a lesser degree of accuracy than the other pressure sensor from which it receives sensor data. For example, the self-calibrating pressure sensor can be a side airbag pressure sensor or other less accurate pressure sensor than the other pressure sensor, which can be a manifold air pressure sensor or a barometric air pressure sensor.

In one aspect, a pressure sensor system comprises a first pressure sensor with electrodes and a membrane, which generates a deflection or a displacement from a first position to a second position as a function of an electrostatic force. One or more voltages can be applied to the electrodes induce the electrostatic force for the resulting deflection. The system determines a capacitance value that corresponds to an applied voltage at the electrodes by the displacement of the membrane as a function of the electrostatic force. A self-calibration component of the system can further calibrate a pressure sensor to target values with the sensor parameters derived from the capacitance values and from an external pressure (e.g., an ambient or atmospheric pressure) that is received from a second pressure sensor (e.g., a manifold air pressure sensor, a barometric air pressure sensor or other pressure sensor) with a higher range of accuracy.

A network of sensors or a sensor network can thus be communicatively coupled via a system controller/processor (e.g., an airbag control unit, an engine control unit, other vehicle controller, or the like) and support the self-calibration of particular pressure sensors, such as a pressure sensor in a vehicle (e.g., a car, a truck, a plane or other mobile mechanical means of transportation) or other sensor communication system. A sensor network can include one or more sensors communicatively coupled to one another via a controller by one or more communication paths. The communication can be with a communication protocol for within a same sub-system, or with another sub-system via another controller using the same or a different protocol, for example. Additional aspects and details of the disclosure are further described below with reference to the following examples with figures.

EXAMPLES

Referring to FIG. 1, illustrated is an example of a pressure sensor system 100 that enables a self-calibration of a pressure sensor utilizing an electrostatic force and is capable of self-calibration with another sensor. A self-calibration can include a re-calibration of sensor parameters within a certain manufacturing tolerance range or a target value. The system 100 can be a part of, or communicatively coupled to other sensor communication systems or sub-systems of a vehicle or other device 101, for example, in which a vehicle refers to any motorized or non-motorized means for transportation, or mode of transportation.

The system 100 comprises a first pressure sensor 102, a second pressure sensor 104, a self-calibration component 106 of the first pressure sensor, one or more processors or controllers 108 and a data store 110, and operates to enable or support a self-calibration operation for the pressure sensor. The first pressure sensor 102 can be configured to measure quantifiable pressure forces from any one of a number of different variables such as fluid/gas flow, air, speed, water level, altitude, and others by acting as a transducer and generating a signal as a function of a change in a surrounding environment or a sensed pressure. The first pressure sensor 102 can comprise a force collector comprised of a diaphragm or membrane 103 that measures a strain, or a deflection, that results from an applied force over an area (A) of the membrane 103. The first pressure sensor 102 can operate as a micro electromechanical system (MEMS) pressure sensor that includes electrodes 105, 107 with the membrane 103, reacting to a deflection induced by an electrostatic force from an applied voltage between the membrane 105 and the electrodes 105 or 107. In addition, the first pressure sensor 102, as illustrated, can represent a single sensor, or a plurality of pressure sensors coupled to one another.

In one embodiment, the first pressure sensor 102 generates a self-calibration of its own sensor parameter(s) to one or more target values, stored in the data store 110 or communicated via the controller 108. A deflection of the membrane 103 from an electrostatic force at the first pressure sensor 102 enables an extraction of sensor parameters, which can further be modeled, stored and utilized for self-calibration by the first pressure sensor 102. The self-calibration process can include a comparison between measurements with respect to time across a time differential and include a single, externally supplied pressure reading or measurement provided by the second pressure sensor 104. The comparison can be used to dynamically self-calibrate the pressure sensor with various values related to sensor parameters, which can include a membrane area, one or more spring constants, sensor dimensions, distance between electrodes, height from membrane to a cavity bottom, a permittivity constant, applied pressure, linearization polynomial coefficients or other such parameters, which are a part of sensor function and manufacturing specifications that reside within a process tolerance or fabrication range, for example.

The second pressure sensor 104 operates to sense an external pressure (e.g. an ambient pressure), and communicate sensor data related to the external pressure to the first pressure sensor 102 for self-calibration. The second pressure sensor 104 can detect pressure or derive pressure sensor data from a change in pressure with a greater accuracy degree/level than the first pressure sensor 102. The second pressure 104 is thus configured to detect changes in pressure with a greater accuracy range, or with an accuracy that is closer to the actual ambient pressure than the first pressure sensor 102.

In addition, the second pressure sensor 104 comprises a different pressure sensor than the first pressure sensor 102. For example, the first pressure sensor 102 (e.g., an airbag/impact sensor) can be integral part of a first control system, which can include an airbag control system, pedestrian detection system, motor control system, other vehicle system or senor system, for example. For example, the controller 108 can operate as an airbag control unit that monitors and controls data from one or more airbag sensors, impact sensors, object detection, or other sensors. The second pressure sensor 104 can be a sensor coupled to the same controller 108, for example, or coupled to another second control system, such as an engine control system of the vehicle, exhaust control system of the vehicle, or other device 101 or system having a different controller (not shown) that monitors and controls data from one or more other sensors of a sub-system or sensor network, for example.

The second pressure sensor 104 can be a manifold air pressure sensor, for example, a barometric air pressure sensor or other pressure sensor having a greater accuracy than the first pressure sensor 102. In addition, the second pressure sensor 104 can be located on or integrated to the same board or a same chip as the controller 108, and communicatively coupled with a same communication network or network protocol as the controller 108 and the first pressure sensor 102. Alternatively, the second pressure sensor 104 can be part of a different sub-system in the vehicle or device 101, having a different controller and set of sensors in a same or different communication network with a same or different network protocol.

The first pressure sensor 102 further receives sensor data or a pressure reading from the second pressure sensor 104 from communications received, either directly or via the processor or controller 108, which is coupled to the data store 110 for storing or retrieving sensor data including pressure data, measurement, readings, target values, parameters values, or other like sensor data. The first pressure sensor 102 self-calibrates parameter values according to the target values based on one or more various criteria, such as a predetermined timing, a predetermined interval, an event occurring (e.g., an engine start, process variation events, aging events, or other event triggers), as well as the single, external, and more accurate pressure data or external pressure measurement received from the second pressure sensor 104. Additionally, the first pressure sensor 102 can self-calibrate itself without using a pressure measurement/reading from itself, but rather model or derive parameter values and generate self-calibration with only a single pressure measurement/reading/data from the second pressure sensor 104.

In one example, the first pressure sensor 102 self-calibrates, or dynamically re-calibrates with the self-calibration component 106. The self-calibration can be based on a simplified model that adjusts for various unintended inaccuracies of the sensor parameters, such as via operation wear, process tolerances, temperature influence or other altering variables that can occur over the course of operation of a vehicle or other system. The self-calibration component 106 can initiate at predetermined times, predetermined intervals or dynamically in response to one or more triggering events.

For example, at each day, week, month, etc., the self-calibration component 106 can initiate a self-calibration process within the first pressure sensor, make a request for an outside sensor reading with a higher accuracy level, within a certain accuracy level to the controller 108, or receive pressure data related to an outside or ambient pressure from a different sensor for self-calibration of the first pressure sensor. In one embodiment, the self-calibration component 106 can initiate a self-calibration process at a triggering event, such as the starting or igniting of the vehicle motor, the ignition system operating at full power, a temperature threshold being obtained to adjust or re-calibrate for temperature variations of the vehicle system or another system. A triggering event can also include an elevation level being reached above a sea level mean, an outside wind speed, an aging range or detectable component wear of a sensor or other component, an unlocking of the vehicle or other system/sub-system use or function of a related component, for example.

The first pressure sensor 102 or the controller 108 can also be configured to monitor an ambient pressure to ensure that an external pressure with respect to the first and second sensors 102, 104 is within a certain or predefined range before an initiation of self-calibration. For example, a side air bag sensor as the first pressure sensor 102 could initiate the self-calibration as long as a crash is not detected, is occurring, a side impact is not impacting readings or operation, or other event trigger that could cause an inconsistent reading outside of a predefined pressure range for the external environment. For example, self-calibration triggers could comprise a starting of an engine, before operation, or, in the case of a manifold air pressure sensor, when no powering is occur or has occurred. Triggers can include, but are not limited to a powering of the controller 108 or other system controller, in which an external acknowledgement could be communicated before performing self-calibration. For example, a driver or operator of the system, a controller or other communication component could respond to a request from the sensor 102 or controller 108 with an acknowledgement indicating that pressure readings from the first and second sensor 102, 104 are within the defined range or are approximately equal.

In another aspect, the controller 108 can operate to generate a higher accuracy pressure reading, measurement or data from the second pressure sensor 104 to then communicate such data to the first pressure sensor 102, or alternatively select another sensor, which could be operationally powered, not in use, or otherwise available for providing sensor data with the requisite accuracy. The controller 108 can also initiate, request or receive sensor data with a greater accuracy than the first pressure sensor is capable from an outside transmitter, diagnostic tester device, or other device. Additionally or alternatively, the controller 108 can generate a request for sensor data related to a pressure having a different or a greater level of accuracy than the second pressure sensor 104, as well as prioritize one sensor and another sensor for providing the external pressure measurement to the first pressure sensor 102, in cases in which the second sensor 104 is inoperable or no longer in communication with the sensor network environment.

The self-calibration component 106 of the system 100 is configured to calibrate the pressure sensor 102 to a set of target values with a set of sensor parameters derived from the measurements of the sets of capacitance values. The target values, for example, can comprise factory operating range values for one or more parameters intended to define one or more functions of the pressure sensor. A self-calibration can be generated from parameter values derived from the measurements and one or more pressures, such as an ambient pressure or other pressure. The pressure sensor 102, for example, can be calibrated at the end of a fabrication process line under defined measurement conditions, which can be performed with different pressures at different temperatures. Although, a simplified model generated by the self-calibrating pressure sensor can function similarly for self-calibration. Calibrations, for example, can often involve complex polynomials with respect to pressure and temperature, piecewise linear functions or spline functions as well.

The system 100, for example, generates a self-calibration process via the self-calibration component 106 by generating a simplified model and extracting parameter values via a model. The model, for example, can be a capacitance model such as a capacitance bridge based model, a moving plate based model, or other type capacitance model for performing more efficient calibrations and recalibrations for self-calibration. For example, electrodes 105, 107 of the pressure sensor 102 can operate to form a capacitive full bridge, in which various voltages can be applied to an input pair of nodes or terminals of the capacitive full bridge. Capacitance values can be obtained at an output pair of nodes of the capacitance full bridge and further utilized to derive, estimate, and re-calculate operating parameters of the sensor 102. The capacitance values can include capacitance values derived from a differential output utilized to model different parameters of the pressure sensor. The capacitive bridge modeled across the electrodes 105, 107 can couple to electrodes that bridge one or more pressure sensors 102 comprising different parameters of operation for modeling displacement by an electrostatic force.

Because a deflection of a membrane or diaphragm of the pressure sensor 102 is bent or displaced by distributed forces, the behavior can be modeled in a complicated function and also behaves differently for pressure forces and electrostatic forces. Therefore, the macroscopic behavior of the pressure sensor can be described with a generated model, which is limited to a reduced operating range or an operating range that can be less than a fabricated or normal standard operating range for the pressure sensor 102, for example. The reduced operating range, for example, can be characterized by a small displacement in a Z direction along a Z-axis of a three dimensional Cartesian coordinate system as compared to a fabrication distance d of the electrodes or plates of the pressure sensor. Within the range of validity or reduced operating range, the displacement Z can represent a function of the membrane or diaphragm bending (w) with respect to a an x- and y-axis as w(x,y) or of the real/actual diaphragm averaged over x- and y-dimensions of the diaphragm. Evaluation of the capacitance changes can be performed via an open loop pathway by changing the sensor bias voltage and measuring the corresponding reaction of the sensor capacitor values, or an evaluation can be performed via a feedback loop such as a closed force feedback loop, for example. The model values can be stored (e.g., data store 110) along with the sensor target values, parameter values, capacitances, etc. in data store 110 and processed via one or for further reference or calculated re-iterations via the model for self-calibration.

Figure 2:
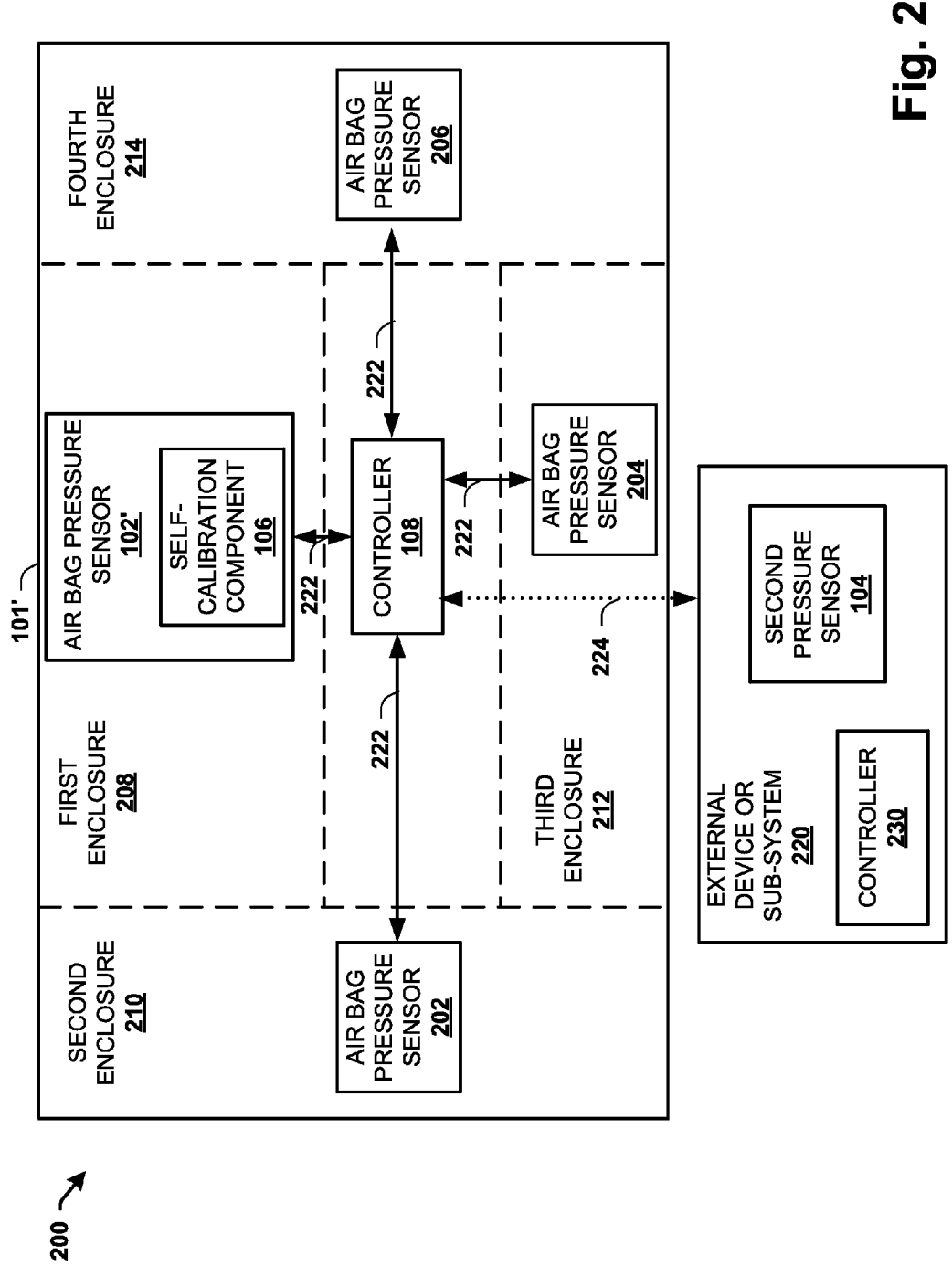
FIG. 2 is a block diagram illustrating another pressure sensor system for self-calibration of a pressure sensor according to various aspects described.

Referring now to FIG. 2, illustrated is a system for facilitating self-calibrating in one or more pressure sensors according to further various aspects. The system 200 illustrates similar components as discussed above and further comprises additional aspects and related details.

For example, the system 200 comprises an air bag pressure sensor 102' as similar to the first pressure sensor 102 discussed above, in which discussion of either can apply to both sensors herein. Additional air bag sensors 202, 204, and 206 similar to the first pressure sensor 102 or sensor 102' can also be integrated within a vehicle 101' and communicatively connected to the controller 108 via communication paths 222 in a sensor communication network. The network communication paths 222 can communicate according to a communication protocol such as a controller area network, FlexRay, an Automotive Ethernet communication or other communication standard or protocol, for example.

In one aspect, the air bag pressure sensor 102', the air bag pressure sensors 202, 204 and 206, and the controller 108 form an air bag sensor system 200 for the vehicle 101'. Each air bag sensor, for example, operates to detect a pressure differential or a pressure change within an enclosure, such as a confined portion, a section, a compartment, a tube, a component or a substantially enclosed space of a vehicle. For example, the airbag sensors 102', 202, 204 and 206 can be housed at different locations of a vehicle 101' within a first enclosure 208, a second enclosure 210, a third enclosure 212 and a fourth enclosure 214, respectively. While various air bag sensors 102', 202, 204 and 206 and at least the second pressure sensor 104 are represented, a different number of any one sensor or type of sensors, enclosures, or controllers is also envisioned by this disclosure.

In another example, the enclosures 208, 210, 212, and 214 can include enclosures formed by a door of the vehicle 101', a bumper, or other enclosed compartment or enclosure for housing one or more of the respective air bag sensors 102', 202, 204 and 206, which are configured to detect a change in pressure within the enclosure from a collision, forced impact or other cause of a change in pressure within the respective enclosure. For example, the second and fourth enclosures 210 and 214 can be a front and a rear bumper of the vehicle 101', while the first enclosure and third enclosures 208, 212 can be a side door. Alternatively or additionally, the enclosures can represent a steering column/wheel, a dash board, or any other enclosure within the vehicle 101', for example, or in the case of other sensor types (e.g., pedestrian detection sensors, or other pressure sensors), other enclosures in other devices (e.g., a communication device or other device). Although the sensors 102', 202, 204 and 206 are illustrated as air bag sensors, the sensors can also be pedestrian or obstacle safety sensors that measure pressure inside a tube inside one or more of the enclosures, or other type pressures sensors, for example.

The system 200, as an example for discussion, can thus comprise an air bag sensor system of the vehicle 101', which utilizes airbag pressure sensors for the detection of impacts by measuring the pressure inside the enclosure (e.g., door, bumper, etc.), and should be equal to the ambient pressure unless the enclosure (e.g., door compartment) is deformed rapidly, as in the case of a crash. These sensors or other identical sensors can also be used to detect pedestrian impacts, which measure the pressure inside a tube running through the front bumper or other enclosure, where the tube is under ambient pressure as well unless no crash happens and deforms the tube faster than the air can leave the inner space of the tube. In situations in which the external pressure is not approximately equal among the first and second pressure sensor 104 or the air bag sensors (e.g., side air bag sensors, front sensors, etc.) and the second pressure sensor 104, then the self-calibration could be inhibited by the controller 108 or the self-calibrating sensor 102', 202, 204, or 206 itself.

The sensors 102', 202, 204 or 206 operate well for self-calibration as a result of being configured to permanently measure the ambient pressure, which is also measured by other sensors inside the vehicle or car, such as with the second pressure sensor 104 (e.g., a barometric air pressure sensor in the motor control system of the vehicle 101', a manifold air pressure sensor, or other air pressure sensor). The air bag pressure sensors 102', 202, 204 or 206 comprise lower accuracy requirements than the second pressure sensor 104, since each of the air bag pressures sensors 102', 202, 204 or 206 is configured for the detection of relative changes in a certain frequency range. Thus, they monitor a detection function $$f(p) = \frac{p}{p_0(p)} - 1$$

that ensures the measured pressure transient is normalized to a same range independently of the weather, temperature, elevation, the height over mean sea level (MSL) or other environmental parameters. This also explains why the absolute accuracy of the pressure measurement is not of primary importance for the air bag pressure sensors 102', 202, 204 or 206 as compared to the second pressure sensor 104, which can be utilized for a diversity of purposes. However they still need more accuracy (<5% accuracy error) as a MEMS fabrication can provide without calibration (<30% accuracy error). In one embodiment, the second pressure sensor can detect a change of the external pressure measurement relative to an ambient pressure, and communicate, to the controller or the first pressure sensor, the external pressure measurement based on the change, which could require longer or different time periods between measurements to determine.

Each of the air bag sensors 102', 202, 204 or 206 can operate to communicate data to the controller 108 via the communication paths 222 (e.g., links, channels, buses, optical fibers, etc.) in order to trigger a vehicle 101' response to the detected change in pressure or to an acknowledgment that the external pressures or sensed pressures are close. Each of the sensors 102', 202, 204 and 206 can also comprise the self-calibration component 106 described above in relation to FIG. 1 and can independently or collectively receive a pressure reading, measurement or data from the controller 108 via the second pressure sensor 104, or directly from the pressure sensor 104 of an external device or sub-system to the sensor system 200 of the vehicle 101'.

Alternatively or additionally, a different controller 230 configured to control data communication to the second pressure sensor 104 can communicate with the controller 108 to provide a higher accuracy pressure reading or sensor data related to a pressure function for the self-calibration component 106. For example, the higher accuracy pressure data from the second pressure sensor 104 can be communicated via a wired or a wireless communication path 224, which can be a temporary communication connection formed or a permanent connection.

For example, the controller 108 can communicate a request to the external device or vehicle sub-system 220 in order to obtain a response having the higher pressure sensor data for deriving a higher accuracy pressure reading or measurement, or an actual, ambient pressure reading measurement. Additionally, the external device or sub-system 220 can facilitate the self-calibration of one or more of the air bag pressure sensors 102', 202, 204 and 206 by communicating the pressure reading or data to controller 108 or air bag pressure sensors 102', 202, 204 and 206.

In another embodiment, the external device or sub-system 220 can include a manifold exhaust system, which the controller 230 and second sensor 104 can be a manifold control system. Alternatively or additionally, the external device or sub-system 220 can be a transmitter or a transceiver device, or a diagnostic tester device or interface for use in a vehicle garage or vehicle diagnostic center, for example, which can communicate at a different communication protocol or standard than the communication paths 222, such as by a wireless car 2 infrastructure communication protocol or another protocol. The second pressure sensor can be a part of (within) the air bag control system or network, or separate, as illustrated, and can comprise a pressure sensor such as a barometric pressure sensor or any air pressure sensor having a greater accuracy level or range for the detection of an ambient pressure or a reference pressure for self-calibration. The controller 230 can also be a motor controller, an engine control unit or other system controller of the vehicle 101'.

The second pressure sensor 104 can be other types of sensor also, including a barometric pressure sensor or a manifold air pressure sensor, which operates to calculate a mass of air that is drawn into the combustion chamber of the motor, and thus has a high absolute accuracy of <1%, or an accuracy error percentage that is less than 1% or a higher statistical value than the air bag pressure sensors for determining pressure. Thus, the second pressure sensor 104 (e.g., a manifold air pressure sensor, barometric air pressure sensor or other sensor) is accurate enough to be the reference for the self-calibration of the any one or more of the vehicle air bag pressure sensors 102', 202, 204 and 206. For the case that the powertrain barometric air pressure data is not accessible for the airbag controller 108, for example, another sensor with high accuracy or a higher accuracy than the sensors 102', 202, 204 and 206 can be added on the airbag ECU board, or part of the controller 108 chip or substrate as an integrated component or communicatively coupled permanently thereto, for example.

In addition, the second pressure sensor 104 can be multiple pressure sensors. For example, one second pressure sensor 104 can be a first barometric air pressure sensor connected to the controller 108, and a second barometric air pressure sensor can be communicatively coupled to the controller 108 via the different controller 230. In response to the controller 108 being inoperable or communicatively disconnected from one of the second pressure sensors, the controller 108 could receive the external pressure measurement (reference pressure) from a different barometric pressure sensor. A priority basis could be assigned to each second pressure sensor as well.

Figure 3A:
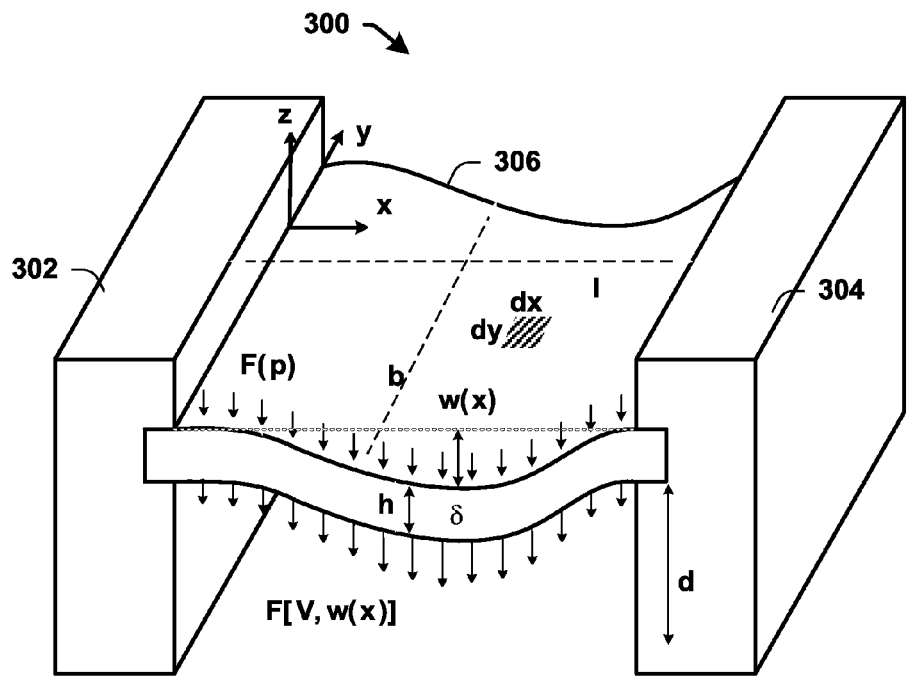
FIGS. 3A-3B are diagrams illustrating pressure sensor models for self-calibration of a pressure sensor according to various aspects described.
Figure 3B:
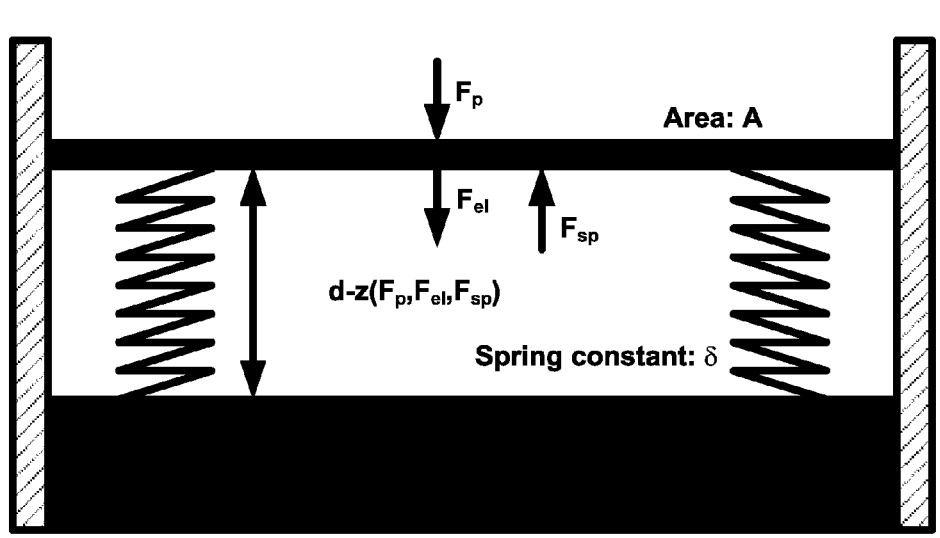

Referring now to FIGS. 3A and 3B, illustrated are diagrams of example pressure sensor models for the self-calibration of one or more pressure sensors via self-calibration component 106, for example, according to various aspects being disclosed.

The self-calibration component 106 can be a part of, as separate components or as one component, each pressure sensor 102', 202, 204 or 206 of FIG. 2, or the first pressure sensor 102 as discussed in FIG. 1. The self-calibration component 106, for example, can generate a bias or an applied voltage to electrodes of the pressure sensor 102 and facilitate control of the displacement of a pressure sensor membrane with an electrostatic force. The self-calibration component 106 can generate the electrostatic force with the applied voltages via an open path, or a closed loop feedback path based on the sensor parameters (e.g., diaphragm/membrane area, etc.) and at least one pressure, such as an ambient or atmospheric pressure without having more than one pressure reading or measurement. The pressure can be obtained from an external reading or system internal reading, which can be, for example, of an ambient pressure from a different pressure sensor having a greater accuracy.

The self-calibration component 106 can operate to control the bias or applied voltage and measure one or more capacitance values corresponding to the applied voltages across a time differential and various modifications to the applied voltage. In addition or alternatively, the self-calibration component 106 can measure capacitances simultaneously among at least two pressures sensors (e.g., sensor 102, 104, or another sensor) that comprise different sensor parameters within a same tolerance range.

One or more of these sensor parameters, for example, can be matched with one another. For example, the sensors could be selected prior to model generation to be functionally equivalent, or almost equivalent. For example, the areas of a membrane can vary, while fabrication distances between the plates or the electrodes of different sensors can be at least substantially equal. The fabrication tolerances that derive from the tolerances during fabrication processing are at least substantially equal, or within the same tolerance of design, for example, which enables the fabrication tolerances of the two sensors to be described by one variable technological parameter within the model being generated for elimination of independent variables from the equation system that are solved during self-calibration. The self-calibration process can be generated by a model of the sensor parameters via the self-calibration component 106 as a capacitive model (e.g., a capacitive bridge model, a moving capacitor plate model, or the like) that models the displacement of the first membrane from a first position to a second position within the reduced operating range. For example, the displacement can be characterized or modeled by a nonlinear function of an actual configuration of the first pressure sensor and a two dimensional deflection curve of the first plurality of electrodes.

FIG. 3A illustrates an example diagram model 300 of a pressure sensor (e.g., sensor 102) that demonstrates a voltage required to achieve one or more target values such as a capacitance value between plates 302 and 304 of the pressure sensor based on defined sensor parameters (e.g., membrane area (A), a distance (d), a height of the membrane (h), a spring constant (6), an applied pressure (p), etc.), in which other parameters can also be incorporated in the model generation or the modeling process for calibration/recalibration such as a permittivity constant (c), a coefficient of expansion, a material coefficient like the Young's modulus or other relevant parameters. An advantage of characterizing these parameters via applied voltages (V) to induce an electrostatic force is a relatively simple structure, which can be applicable for numerical evaluations on a relatively small processor, such as a digital signal processor (DSP) that includes or is a part of the system components.

The model according to FIG. 3B can be configured to model the displacement of a membrane of the pressure sensor from the more detailed model according to FIG. 3A from a first position to a second position, which can be a function of a bending within a reduced operating range. In this manner, a simplified model according to FIG. 3B can be implemented via the self-calibration component 106 instead of a complex bending behavior of a real membrane that is illustrated as an example in FIG. 3A and enables equations that can be realistically solved with sufficient accuracy and reliability in the field. The displacement (w), for example, can be characterized by a complex nonlinear function of a real or actual arrangement of the pressure sensor and at least a two dimensional deflection curve of the membrane 306 across the sensor electrodes 302, 304. This displacement can be demonstrated, for example, along a z-axis in a z-direction by a bending function with respect to an x-axis displacement in an x-direction and a y-axis displacement in a y-direction.

The following equations can operate to describe the models 300 and 330 of FIGS. 3A and B, for example, and can serve as an approximation for the structure in FIG. 3A within a limited validity range:

for an electrostatic force; eqn. 1
$$F_{el} = \frac{1}{2} \cdot \frac{\varepsilon \cdot A \cdot V^2}{(d-Z)^2};$$

for a spring force; eqn. 2
$$F_{sp} = \delta \cdot z;$$

for a pressure force; eqn. 3
$$F_p = p \cdot A;$$

$$\frac{1}{2} \cdot \frac{\varepsilon \cdot A \cdot V^2}{(d-Z)^2} + -\delta \cdot z + p \cdot A = 0;$$ eqn. 4 and $$V(z)^2 = \frac{2 \cdot (d-Z)^2 \cdot (\delta \cdot z - A \cdot p)}{A \cdot \varepsilon}.$$ eqn. 5

The equations below further describe parameters such as an applied voltage that facilitates an electrostatic force to achieve a certain capacitance between plates or electrodes 302 and 304 of the pressure sensor 102, for example.

$$C(z) = \frac{\varepsilon \cdot A}{d-z} \quad z(C) = d - \frac{A \cdot \varepsilon}{C}$$ eqns. 6

$$V(C)^2 = -\frac{2 \cdot A \cdot \varepsilon \cdot (A \cdot p - \delta \cdot d)}{C^2} - \frac{2 \cdot A^2 \cdot \varepsilon^2 \cdot \delta}{C^3}.$$

Equations 1 through 6, with additional formulations below, demonstrate that two different measurements of at least two pairs of electrostatic driving voltages and capacitances (e.g., $V_1$, $C_1$, and $V_2$, $C_2$) can be modeled and captured at a same pressure (p), such as at an ambient pressure. The same pressure (p), for example, can be a single pressure that is independent of any other pressure reading or other external pressure for self-calibration of the first pressure sensor 102, for example, and received from the second, more accurate second pressure sensor 104.

The symbol (A) designates a membrane area 306 that comprises dimensions (h) for a height or vertical width of the membrane and at a distance (d) from a bottom of one or more plates/electrodes 302, 304. The membrane 306 can be a diaphragm or flexible structure that is sensitive to pressure forces and spans between plates 302 and 304. A bending of the membrane 306 can be induced by an applied voltage that operates as an electrostatic driving voltage. The electrostatic force generated across the membrane can cause a variation in the membrane as a bending, deflection or displacement from a first position to a second position. The bending, for example, can be a function of a displacement in a three dimensional plane with a Cartesian coordinate system having an x-axis, y-axis and a z-axis. The bending function w(x) can be expressed as w(x, y), or as w(x, y, z), in which bending w(x, y) can represent the displacement Z within a reduced operating range of the real diaphragm 306 averaged over the x and y dimensions of the diaphragm. The reduced operation range, for example, can be an operating range that is reduced relative to a standard, a normal, or a manufactured operating range. The reduced operating range, for example, can be a range of operation that is a subset of the normal, standard, or manufactured range of operation, such as provided in a manufacturer specification sheet or product data sheet, or the reduced operating range can be a range of operation that is less than this normal, standard or manufactured range of operation, such as, for example, a reduced range of the measured pressures and the applied electrostatic forces that bend the membrane, specified in a way that deflection of the membrane stays small or incremental. Additionally, the reduced operation range can be characterized as a small displacement z compared to a fabrication distance (d) of the plates 302, 304.

The models 300 and 330 can also be generated and demonstrated via an inverse solution of the equation C(V) as with the below set of derived equations:

$$p = \frac{\delta}{A} \cdot d - \left(\frac{1}{C_1} \cdot \delta \cdot \varepsilon + \frac{C_1^2 \cdot V_1^2}{2 \cdot \varepsilon \cdot A^2}\right)$$ eqns. 7

$$p = \frac{\delta}{A} \cdot d - \left(\frac{1}{C_2} \cdot \delta \cdot \varepsilon + \frac{C_2^2 \cdot V_2^2}{2 \cdot \varepsilon \cdot A^2}\right)$$

$$\frac{\delta}{A} \cdot d - \left(\frac{1}{C_1} \cdot \delta \cdot \varepsilon + \frac{C_1^2 \cdot V_1^2}{2 \cdot \varepsilon \cdot A^2}\right) = \frac{\delta}{A} \cdot d - \left(\frac{1}{C_2} \cdot \delta \cdot \varepsilon + \frac{C_2^2 \cdot V_2^2}{2 \cdot \varepsilon \cdot A^2}\right)$$

$$\delta = \frac{1}{2 \cdot A^2 \cdot \varepsilon^2} \cdot \frac{C_1^3 \cdot C_2 \cdot V_1^2 - C_1 \cdot C_2^3 \cdot V_2^2}{C_1 - C_2}.$$

By performing two different measurements two pairs of corresponding values of capacity and electrostatic driving voltage (V1,C1) & (V2,C2) can be captured at the same pressure (p). Because the electrostatic measurement can be done very fast (e.g., less than a micro second), the pressure (e.g., atmospheric) not changing significantly between the two measurements for most applications. In response to the area (A) of the pressure sensor diaphragm being known or determined, the spring constant (δ) can be derived. In one example, the pressure sensor can comprise a MEMS pressure sensor with a MEMS pressure diaphragm with an area (A) that can be defined by a lithographic process, which is highly accurate, and the fabrication process, which has a certain manufacturing tolerance or process tolerance. The accuracy of the lithographic area (A) can be sufficient for modelling especially for pressure sensors that have moderate precision requirements, or ones that have a very large geometry compared with the fabrication accuracy of the process. Once the spring constant (δ) is derived, the fabrication distance of the plates (d) can be calculated from one of the electrostatic measurements with only one pressure being known throughout the modelling process. For example, the measurements can be performed under a known ambient pressure, as provided by the second pressure sensor 104 in order to achieve a full calibration of the sensor.

A self-calibration could be done at any single known, sensed, reference pressure (e.g., ambient pressure) because the area of the membrane 306 can be assumed to not be affected by aging, and not an unknown variable for the self-calibration. However, the area can be corrected as a result of the expansion of silicon depending on the die temperature. With this knowledge a recalibration is possible at any time where a known pressure can be determined or an ambient external pressure is determined.

With regard to MEMS pressure sensors in particular, a majority of aging effects are the result of changing stress on the membrane 306. The stress can have two main causes. For example, a first part of this stress could be generated by thermal expansion of different materials (e.g., monocrystaline silicon, polysilicon, silicon oxide, silicon nitride, aluminium, or copper) of the chip itself, and the second part of the stress can be generated by the interface between the chip and the package. A third cause of mechanical stress can arise from mechanical contact between the package and its assembly to the application environment. All causes of stress on the sensor, especially the second cause, can be assumed to change over time, and thus represents the major part of aging effects, which can be addressed or corrected by a self-calibration. The effect of the inherent system mechanical stress situation causes a change of the deflection of the membrane under identical pressure and electrostatic driving voltage, even in a force free situation where the distance of the membrane of the sensor should be exactly the fabrication distance d. Explicitly this change can only be the parameter (d) in the simplified model. Therefore, this distance can be an approximate distance at the edges of the sensor capacitor where the membrane ends in the solid die, and instead be a virtual position of a movable plate of a plate capacitor model, which equates the capacitance to a value that would be measured in situations where the real sensor is free of pressure and electrostatic force. The self-calibration of the distance (d) can be without knowledge of any other pressure other than a known atmospheric or external single pressure as received by the second pressure sensor 104, for example. However, there can still exist a strong advantage of the electrostatic force for the recalibration of the sensor, since it can be done with a single known pressure point like the ambient pressure, instead of requiring at least two different pressures for the separation of offset and sensitivity, for example In an aspect, a micromechanical pressure sensor with a membrane that is deflected by electrostatic forces together can be self-calibrated by different methods. The self-calibration, for example, can be based on the reduction of a very complex system to an approximation or model that can be described by simpler equations with a physical background or definition, such as by the model generated by the self-calibration component 106. For example, an area (A) of the pressure sensor diaphragm can be utilized as one parameter that is known to be stable over time and can therefore be excluded from the calibration data that has to be recalibrated after aging of the sensor. Thus, a self-calibration of the sensor spring constant can be enabled under any condition in the field or in real time subsequent to fabrication and initial calibration. A self-calibration of the plate fabrication distance, for example, can be done in response to a single pressure reading or information (e.g., an ambient pressure) being determined. Thus, a full recalibration of the sensor is possible at known ambient pressure without applying another pressure to the mounted sensor.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 4:
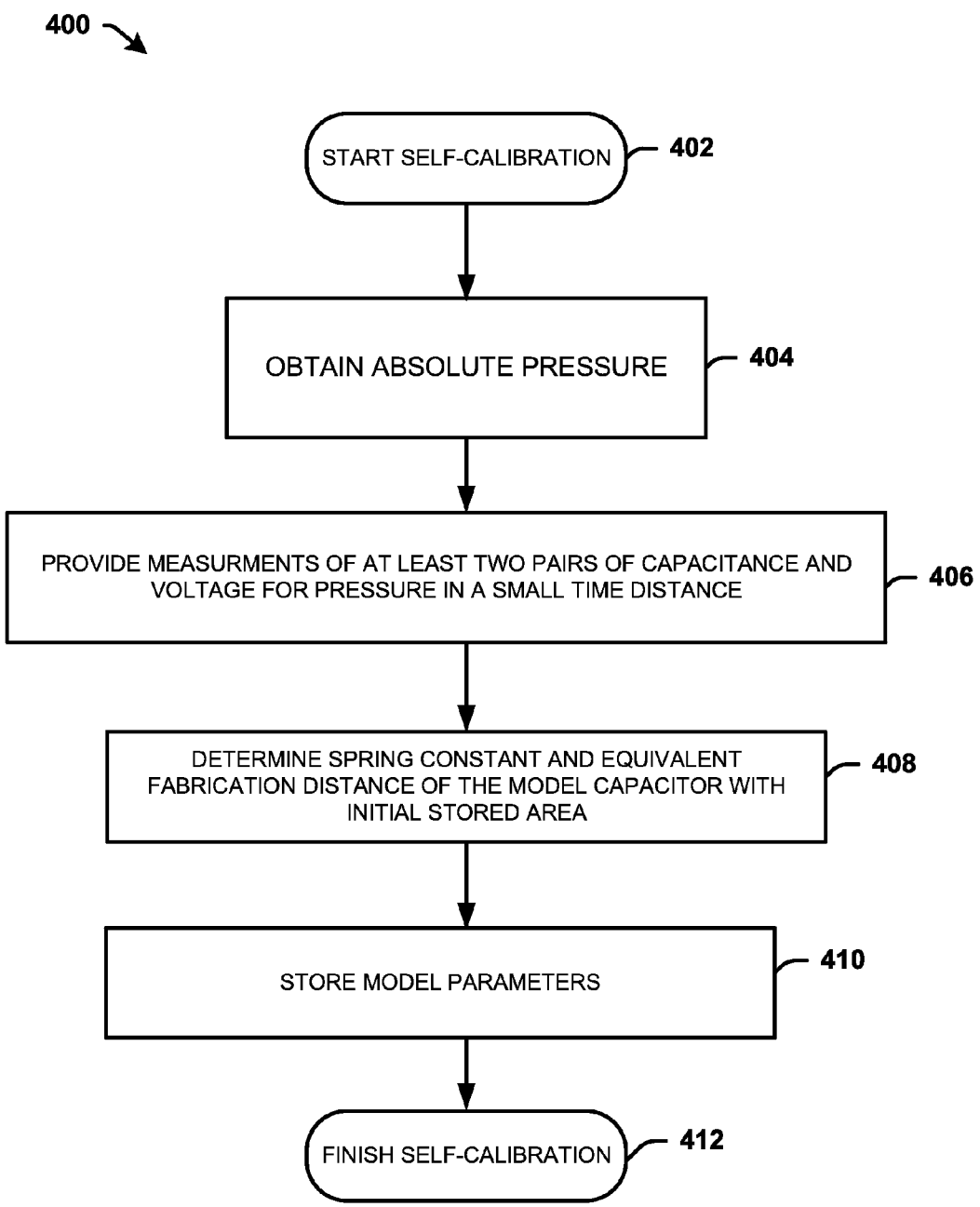
FIG. 4 is a flow diagram illustrating a method of operating a pressure sensor system for self-calibration of a pressure sensor according to various aspects described.

Referring to FIG. 4, illustrates is a method 400 that initiates at 402 with a self-calibration of a pressure sensor. At 404, a pressure is measured or obtained, such as from an external source and as an absolute pressure. At 406, measurements are obtained or provided that comprise at least two pairs of capacitance (C) and voltage (V) for the pressure obtain (e.g., absolute pressure). The pressure can be an atmospheric or a barometric pressure. The measurement pairs can be obtained in a time distance that is short enough to assure that pressure does not change in a relevant range between two measurements, for example.

At 408, a spring constant and an equivalent fabrication distance of a model of the capacitor (e.g., a model plate capacitor) can be determined with an area (A) initially stored of the sensor diaphragm. At 410, the parameters determined can be stored, and at 412, the recalibration is completed.

The self-calibration, for example, can be performed with the model generated via the self-calibration component 106, for example, using the ambient pressure from the second pressure sensor 104 on a standard FE/BE test equipment instead of special equipment that allows to apply different pressures. The ambient pressure reading and modeling processes therefore can be done independently of any other pressure or pressure reading, and with the single ambient pressure alone as a dynamic or real time field self-calibration process.

For example, rather than utilizing two different pressures to characterize a real cell area, or an actual cell area, of the sensor 102, the system 600 can operate to generate a computational model with sensor cells of different areas. The sensors 102 and 104, for example, can exhibit matching characteristics or functioning, or be substantially matched, especially by comprising the same or substantially equal fabrication distance (d), which can include a distance (d) that is between the plates or electrodes of the respective sensors 102, 104.

In an aspect, the first pressure sensor 102 and the second pressure sensor 104 can comprise a fabrication tolerance from respective design parameters (Dp) that can be determined, described and modeled by a single variable, such as a technological parameter (Tp), or referred to as a process parameter or the like connotation. The process parameter can be a function of or derived from a manufacturer or manufactured tolerance range.

As an example, the pressure sensors 102 and 104 can be designed, modeled or fabricated as square membranes with a dimensional length, such as side length (x). At least one pressure sensor 102 or 104 can comprise a smaller dimensional side length with respect to the other, and the pressures sensors 102 or 104 can be connected in parallel one or more (nc) times as one or more pressure sensors in order to achieve a comparable capacitance as a larger capacitance of the other sensor (e.g., pressure sensor 102 or 104) such that, for example, the capacitance→Dp1=x1; Dp2=(x2,nc). The process variation could, for example, be the result of an over etching or an under etching of a cavity that is located below the deflectable diaphragm by a distance (Tp=Δ).

Figure 5A:
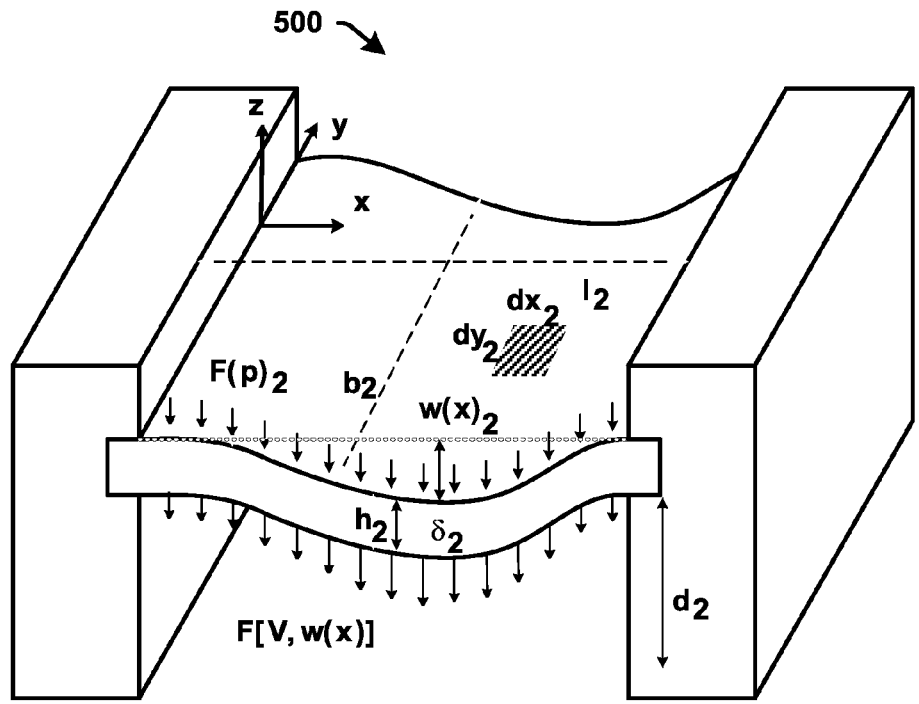
FIGS. 5A-5B are diagrams illustrating pressure sensor models for self-calibration of a pressure sensor according to various aspects described.
Figure 5B:
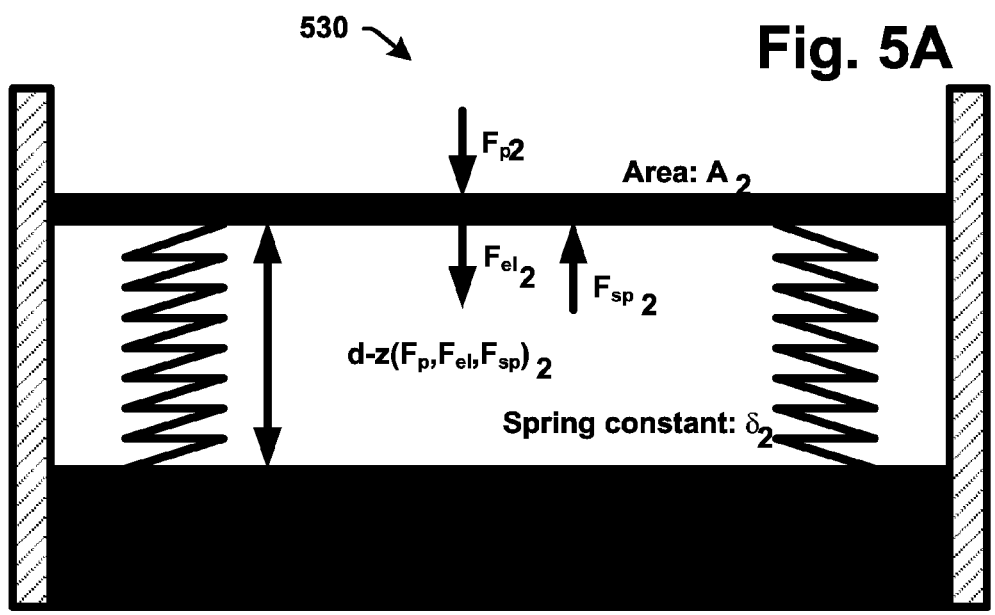

Referring to FIGS. 5A and 5B, illustrated are example model configurations 500 and 530, or architectures of a second sensor and described further in conjunction with reference to elements of FIGS. 3A and 3B. The first pressure sensor 102 and the second pressure sensor 104 can each comprise a dimensional length along a first side (b, b2), for example, of the sensor. The sensor 102 and 104, for example, can include a modeled first and second membrane area A and A2, respectively, which is a function of dy, dx or dy2 and dx2. The first dimensional length can be different than the second dimensional length of the other sensor. Both sensors can comprise a height h and h2, respectively, which negligibly differs as a function of the process parameter. A distance can be represented further as the difference between the deflection of the membrane along a z-axis and the cavity bottom or bottom of the electrodes that can vary depending upon a bending function based on the applied pressures spring that resist the displacement of the electrostatic force generated.

The self-calibration component 106 can operate to determine, with respect to the first pressure sensor and the second pressure sensor, an estimated process parameter that is derived from a manufactured tolerance range. A set of estimated areas of the first membrane and the second membrane can be derived based on the estimated process parameter, and a set of estimated spring constants can be derived from the set of estimated areas. In addition, the model, via the self-calibration component 106, can generate these estimations including an estimated cavity height that is valid for the first pressure sensor 102 and the second pressure sensor 104 (also as air bag pressure sensors 202, 204, 206) according to or for good matching characteristics between the two sensors. The self-calibration component 106 is further configured to re-determine the estimated process parameter based on the estimated cavity height to determine an actual process parameter, a first membrane area of the first membrane and a second membrane area of the second membrane based on the actual process parameter, a first spring constant of the first membrane and a second spring constant of the second membrane, and/or a distance between the first plurality of electrodes of model 300 and the second plurality of electrodes of model 500.

Both sensors cells 102 and 104, for example, can be characterized by two pairs of electrostatic driving voltages and corresponding capacitances. The self-calibration component 106 can facilitate a modeling of the sensor parameters according one or more of the equations described above and below for example.

$$A_1 = F(D_{p1} \cdot Tp)$$
$$A_1 = (x_a + \Delta)^2$$

$$\delta_a(\Delta) = \frac{1}{2 \cdot \varepsilon^2 \cdot [(x_a + \Delta)^2]^2} \cdot \frac{C_{1a}^3 \cdot C_{2a} \cdot V_{1a}^2 - C_{1a} \cdot C_{2a}^3 \cdot V_{2a}^2}{C_{1a} - C_{2a}}$$

$$p = \frac{\delta_a(\Delta)}{(x_a + \Delta)^2} \cdot d - \left[\frac{1}{C_{1a}} \cdot \delta_a(\Delta) \cdot \varepsilon + \frac{C_{1a}^2 \cdot V_{1a}^2}{2 \cdot \varepsilon \cdot [(x_a + \Delta)^2]^2}\right]$$

$$d_a(\Delta) = \frac{(\alpha^* \Delta + x_a)^2 \cdot \left[p + \frac{\varepsilon \cdot \delta_a(\Delta)}{C_{1a}} + \frac{C_{1a}^2 \cdot V_{1a}^2}{2 \cdot \varepsilon \cdot (\Delta + x_a)^4}\right]}{\delta_a(\Delta)}$$

eqns. 8

-continued $$A_2 = F(D_{p2} \cdot Tp)$$
$$A_2 = nc \cdot (x_b + \Delta)^2$$

$$\delta_b(\Delta) = \frac{1}{2 \cdot \varepsilon^2 \cdot [nc \cdot (x_b + \alpha^*\Delta)^2]^2} \cdot \frac{C_{1b}^3 \cdot C_{2b} \cdot V_{1b}^2 - C_{1b} \cdot C_{2b}^3 \cdot V_{2b}^2}{C_{1b} - C_{2b}}$$

$$p = \frac{\delta_b(\Delta)}{nc \cdot (x_b + \alpha^*\Delta)^2} \cdot d - \left[\frac{1}{C_{1b}} \cdot \delta_b(\Delta) \cdot \varepsilon + \frac{C_{1b}^2 \cdot V_{1b}^2}{2 \cdot \varepsilon \cdot [nc \cdot (x_b + \Delta)^2]^2}\right]$$

$$d_b(\Delta) = \frac{(\Delta + x_b)^2 \cdot \left[p + \frac{\varepsilon \cdot \delta_b(\Delta)}{C_{1b}} + \frac{C_{1b}^2 \cdot V_{1b}^2}{2 \cdot \varepsilon \cdot nc^2 \cdot (\Delta + x_b)^4}\right]}{\delta_b(\Delta)}$$

eqns. 9

$$d_a(\Delta) \stackrel{!}{=} d_b(\Delta).$$

eqns. 10

With a determined or known area, the models 500, 530 can enable calculation of both spring constants, which are different due to the different geometries among the sensors that can make the diaphragms smaller or stiffer. In situations where the area, is not determined or still unknown, since it can depend on the technological variation (Δ) or process parameter, the modeling process can utilize the models to initiate from a known range of the technology parameter (Δ). The calculated spring constants derived can be consequently inaccurate as well since the technological variation is an estimated parameter. The ambient pressure (p) can be ascertained from a pressure reading (e.g., the second pressure sensor 104) or a source (e.g., a reference barometer or other component), which enables calculation of an estimate for the cavity height (da, db) and also includes an inaccuracy due to dependence on the estimated spring constant and the estimated area. Starting from the results of (da) and (db), which can be different, the estimates can be updated for the technology parameter (Δ) and recalculated for an actual parameter value such as with (da) and (db), unless they are determined to be sufficiently equal. This modeling process can yield the real or actual values for the process or technology parameter (Δ), the areas (A1, A2), the spring constants (δ1, δ2), and the distance (d=da=db), which can be the real/actual fabrication distance between the two sensor plates of one or more of the sensors 102, 104.

A self-calibration via the self-calibration component 106 can be performed at any single known pressure (e.g., ambient pressure) since the area of the membrane can be assumed to be not affected by aging, and thus not necessarily an unknown for the recalibration process. However it may be corrected due to alterations by the expansion of silicon depending on the die temperature. With this knowledge a self-calibration is possible at any time where a known pressure can be delivered.

With the use of the sensors 102 and 104 having matched cavity heights and different areas, the extraction of all unknown variables such as the technology parameter (Δ), the areas (A1, A2), the spring constants (δ1, δ2) and the distance (d) is possible.

The model generated via the self-calibration component 106 for self-calibration enables a different self-calibration independent of ambient pressure based on the two different areas of the sensor cells, in which the respective areas A1 and A2 of the first and second sensors 102, 104 are unchanged or can be corrected by known expansion coefficients. The parameters can be derived via the model with a measurement pair of a driving voltage and its corresponding capacitance from each sensor cell. In response to the two measurement pairs being acquired under the same pressure conditions (e.g., same barometric pressure), which should be easily fulfilled if the measurements are done simultaneously or in a short time distance, then a computation and calibration can be done by directly calculated the distance (d) from the below equations. For greater accuracy of the self-calibration, a further self-calibration or iteration of calibration computation can be performed for the spring constants ($\delta 1$, $\delta 2$) of each sensor cell before the update of the distance (d) is calculated. An advantage of the sensor recalibration system is that it allows repeating the recalibration continuously in the background of a field or system application and it reduces temperature compensation to the correction of the area expansion of the diaphragm, which is small and well defined by known and stable expansion coefficients.

$$p = \frac{\delta_1}{A_1} \cdot d - \left(\frac{1}{C_1} \cdot \delta_1 \cdot \varepsilon + \frac{C_1^2 \cdot V_1^2}{2 \cdot \varepsilon \cdot A_1^2}\right)$$

$$p = \frac{\delta_2}{A_2} \cdot d - \left(\frac{1}{C_2} \cdot \delta_2 \cdot \varepsilon + \frac{C_2^2 \cdot V_2^2}{2 \cdot \varepsilon \cdot A_2^2}\right)$$

eqns. 11

$$\frac{\delta_1}{A_1} \cdot d - \left(\frac{1}{C_1} \cdot \delta_1 \cdot \varepsilon + \frac{C_1^2 \cdot V_1^2}{2 \cdot \varepsilon \cdot A_1^2}\right) =$$

$$\frac{\delta_2}{A_2} \cdot d - \left(\frac{1}{C_2} \cdot \delta_2 \cdot \varepsilon + \frac{C_2^2 \cdot V_2^2}{2 \cdot \varepsilon \cdot A_2^2}\right)$$

$$d = \frac{2 \cdot \delta_1 \cdot A_1^2 \cdot A_2^2 \cdot C_2 \cdot \varepsilon^2 - 2 \cdot \delta_2 \cdot A_1^2 \cdot A_2^2 \cdot C_1 \cdot \varepsilon^2 - A_1^2 \cdot C_1 \cdot C_2^3 \cdot V_2^2 + A_2^2 \cdot C_1^3 \cdot C_2 \cdot V_1^2}{2 \cdot A_1 \cdot A_2 \cdot C_1 \cdot C_2 \cdot \varepsilon \cdot (A_2 \cdot \delta_1 - A_1 \cdot \delta_2)}.$$

With the above set of equations 11, a change in the area of the membrane or sensor diaphragm can cause a change of corresponding spring constants and capacitance of the sensor. The systems describe herein with at least two different sensors can facilitate determining parameters of a model, which is used for calibration by applying self-generated electrostatic forces under one or more known ambient pressure conditions, and avoids the need of testing at different pressures; thus allowing a calibration on a standard unmodified tester, for example. Further it allows a self-calibration of the parameters that are subject to temperature and aging drift under any operation condition even without knowledge of an actual pressure, such as a pressure at the sensor 102 or additional pressure forces than the single reference pressure, such as from the second pressure sensor 104.

In addition, different models of the technologically induced fabrication variation models of the sensor area can be utilized by the system. For example, the model discussed above could be extended by introduction of a scale factor ($\alpha$) that makes the under etching during a fabrication dependent on the ratio of the different cell geometries.

$$A_1 = F(D_{p1}, T_p) \; A_2 = F(D_{p2}, T_p)$$

$$A_1 = (x_a + \Delta)^2 \; A_2 = nc \cdot (x_b + \alpha \Delta)^2 \quad \text{eqns. 12.}$$

The scale factor ($\alpha$) is a constant that can be calculated from the design geometries ($x_a$) and ($x_b$) by a known rule. For this case the calibration could happen without any modification of the sensor model. Another example might be different over/under etching parameter depending on the orientation of the sensor cell with respect to the crystal directions such as with the following equations:

$$A_1 = F(D_{p1}, T_p) \; A_2 = F(D_{p2}, T_p)$$

$$A_1 = (x_a + \Delta_x) \cdot (x_a + \Delta_y) \; A_2 = nc \cdot [(x_b + \Delta_x) \cdot (x_b + \Delta_y)] \quad \text{eqns. 13.}$$

In the above case, two spreading technology parameters or process parameters could be utilized and the system can be extended to use three different sensors configured with at least some matching parameters and some varying dimensions or other parameters. For example, iterations can be performed to derive identical results for the fabrication height of the cavity (d), which is identical for all three sensor types, and can be calculated as a function of two dimensions ($\Delta x$) and ($\Delta y$).

In addition, other parameters of the sensor cells that do not directly influence the area of the diaphragm can be varied as well. This could for example be the thickness of the diaphragm and would result in sensors that have different spring constants. In this case the sensor cells have the same area and the iterations could be done directly in (A) within the common unknown area of both sensor cells.

The diaphragm of one cell could be stabilized by a oxide pillar in the middle of the cell, which would result in a different sensitivity for the same area as well as in the case with the thicker membrane above and can be handled in the same manner of an iterative determination of the fabrication height (d) of the cavity by variation of (A) as long as the result of (d) matches for both cells. Furthermore, combinations of different area, height and stabilized membranes with oxide pillars located below are possible.

If the sensitivity of one of the membranes is reduced so far that the capacity can be assumed to be constant within the pressure range, the procedure can be simplified, because a sensitivity adjustment would no longer be necessary for these sensor cells. In this case, the cells can serve as reference cells that are pressure independent and therefore they can be used for the extraction of cavity height and area based on the technology fabrication spread parameter as follows with the set of equations 14:

$$A_1 = (x_a + \Delta)^2$$

$$A_2 = nc \cdot (x_b + \Delta)^2$$

$$\delta_a(\Delta) = \frac{1}{2 \cdot \varepsilon^2 \cdot [(x_a + \Delta)^2]^2} \cdot \frac{C_{1a}^3 \cdot C_{2a} \cdot V_{1a}^2 - C_{1a} \cdot C_{2a}^3 \cdot V_{2a}^2}{C_{1a} - C_{2a}}$$

$$\delta_b = \infty \quad \text{Huge spring constant}$$

$$p = \frac{\delta_a(\Delta)}{(x_a + \Delta)^2} \cdot d - \left[\frac{1}{C_{1a}} \cdot \delta_a(\Delta) \cdot \varepsilon + \frac{C_{1a}^2 \cdot V_{1a}^2}{2 \cdot \varepsilon \cdot [(x_a + \Delta)^2]^2}\right]$$

$$d_a(\Delta) = \frac{(\alpha^* \Delta + x_a)^2 \cdot \left[p + \frac{\varepsilon \cdot \delta_a(\Delta)}{C_{1a}} + \frac{C_{1a}^2 \cdot V_{1a}^2}{2 \cdot \varepsilon \cdot (\Delta + x_a)^4}\right]}{\delta_a(\Delta)}$$

$$d_b = nc \cdot (x_b + \Delta)^2 \cdot \frac{a}{C_1}.$$

eqns. 14

By extending this approach to use two pressure insensitive cell types in addition to the pressure sensitive one that shall be calibrated, the calculation of the fabrication spread due to over/under etching can be further simplified and especially adapted to provide a good resolution for the calculation of the cavity height, independent of taking into account the sensitivity of the cells.

eqns. 15

$$A_2 = nc \cdot (x_b + \Delta)^2$$

$$A_3 = nc \cdot (x_c + \Delta)^2$$

$$\delta_b = \infty$$

$$\delta_c = \infty$$

$$d_b = nc_b \cdot (x_b + \Delta)^2 \cdot \frac{\varepsilon}{C_2}$$

$$d_c = nc_c \cdot (x_c + \Delta)^2 \cdot \frac{\varepsilon}{C_3}$$

$$nc_b \cdot (x_b + \Delta)^2 \cdot \frac{\varepsilon}{C_2} = nc_c \cdot (x_c + \Delta)^2 \cdot \frac{\varepsilon}{C_3}$$

$$\Delta = \left[ \frac{C_2 \cdot C_3 \cdot \left[ (x_b - x_c) \cdot \sqrt{\frac{nc_b \cdot nc_c}{C_2 \cdot C_3}} + \frac{2 \cdot C_3 \cdot nc_b \cdot x_b - 2 \cdot C_2 \cdot nc_c \cdot x_c}{2 \cdot C_2 \cdot C_3} \right]}{C_2 \cdot nc_c - C_3 \cdot nc_b} - \frac{C_2 \cdot C_3 \cdot \left[ (x_b - x_c) \cdot \sqrt{\frac{nc_b \cdot nc_c}{C_2 \cdot C_3}} - \frac{2 \cdot C_3 \cdot nc_b \cdot x_b - 2 \cdot C_2 \cdot nc_c \cdot x_c}{2 \cdot C_2 \cdot C_3} \right]}{C_2 \cdot nc_c - C_3 \cdot nc_b} \right]$$

Additionally, the self-calibration could be further simplified by the above computational model approach as well in eqns. 15, since the pressure independent cells can be used for a determination of the cavity height and the fabrication dependent area at any time, completely independent of the actual pressure.

Finally, as noted above, each of the "sensor cells" or pressure sensors (e.g., pressure sensors 102, 602) that are modeled can comprise an array of smaller elementary sensor cells, can also include a capacity difference between arrays of a first elementary type cell and a second elementary type cell as this can be generated or modeled by a capacitive Wheatstone bridge.

Figure 6:
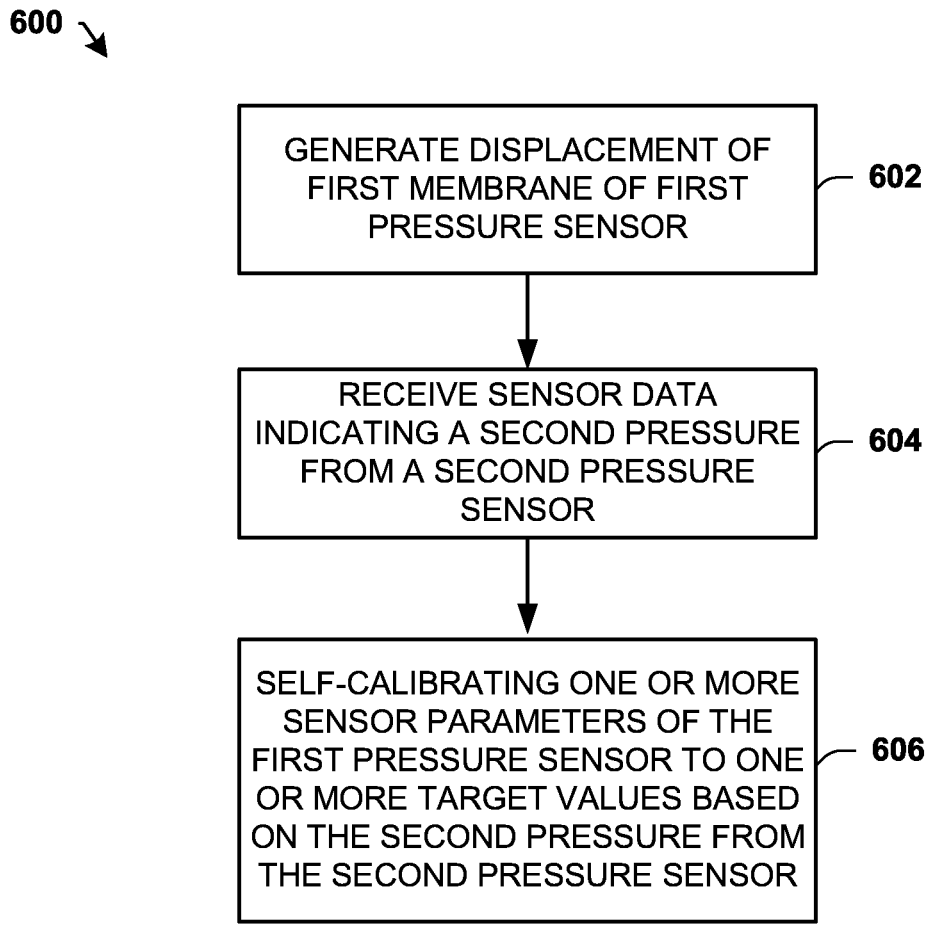
FIG. 6 is a flow diagram illustrating a method of operating a pressure sensor system for self-calibration of a pressure sensor according to various aspects described.

Referring now to FIG. 6, illustrated is a method 600 for pressure sensor self-calibration in a sensor system. The method initiates at 602 with generating a displacement of a first membrane of a first pressure sensor based on one or more electrostatic forces to determine a first pressure. At 604, the method 600 comprises receiving, via or from a second pressure sensor, a sensor data indicating a second pressure. At 606, the method 600 comprises self-calibrating, via the first pressure sensor, one or more sensor parameters of the first pressure sensor to one or more target values based on the second pressure from the second pressure sensor.

The self-calibrating can include deriving the one or more sensor parameters of the first pressure sensor from one or more capacitance values corresponding to one or more applied voltages at a plurality of electrodes of the first pressure sensor, and utilizing the second pressure as a reference pressure and the one or more sensor parameters to self-calibrate the first pressure sensor to the one or more target values. The self-calibrating can include self-calibrating the one or more sensor parameters by the first pressure sensor to the one or more target values independent of the first pressure, wherein the second pressure comprises an ambient pressure derived from the second pressure sensor.

In addition, the first pressure sensor or a controller coupled thereto can operate to monitor an ambient pressure range and determine whether the ambient pressure is within a defined range or approximately equal between measurements detected by the first and the second pressure sensor. If one sensor is outside of the range, the first pressure sensor or the controller would not trigger, or inhibit a self-calibration, in which case a crash condition could be occurred or have occurred, or some other event that could interfere with the self-calibration process.

Receiving the sensor data can include a controller coupled to the first pressure sensor communicating with a different controller coupled to the second pressure sensor. Alternatively, the second pressure sensor can be coupled to the same controller as the first pressure sensor, or be two different second pressure sensors coupled to the same controller as the first and different controller, in which a priority determination can be made based on an availability, operational status or other factor related to the sensors.

The first pressure sensor can be an air bag sensor (e.g., a side air bag sensor, a pedestrian sensor, a crash sensor or the like) and the second pressure sensor can be a barometric air pressure sensor or a manifold air pressure sensor, which has a greater accuracy capability or level than the first pressure sensor.

In an aspect, the method can comprise generating a computational model for sensor calibrations by estimating an estimated process variation parameter that is related to the first pressure sensor and to a second pressure sensor that is also measured and calibrated as the first pressure sensor. Estimated areas and spring constants can be determined that correspond to the first pressure sensor and the second pressure sensor based on the estimated process variation parameter. Then estimated heights of the first membrane of the first pressure sensor and a second membrane of the second pressure sensor can be derived. The set of sensor parameters can then be recalculated by iterations to the set of target values independent of an actual pressure reading, wherein the first pressure comprises an ambient pressure.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A vehicular sensor system comprising:
   a controller configured to communicate with a plurality of pressure sensors associated with a vehicle having a first pressure sensor and a second pressure sensor, wherein the first pressure sensor comprises:
      a plurality of electrodes and a membrane therebetween, wherein the membrane is configured to generate a displacement from a first position to a second position based on application of an electrostatic force thereto to determine a sensed pressure at the first pressure sensor; and
      a self-calibration component configured to facilitate a self-calibration of one or more sensor parameters of the first pressure sensor based on a pressure measurement that is external to the first pressure sensor, and that is hereinafter referred to as the external pressure measurement; and the second pressure sensor configured to determine the external pressure measurement to facilitate the self-calibration of the first pressure sensor;

wherein the first pressure sensor and the second pressure sensor comprise different accuracy levels from one another in determining the sensed pressure at the first pressure sensor and the external pressure measurement at the second pressure sensor, respectively.

2. The vehicular sensor system of claim 1, wherein the second pressure sensor is further configured to measure an ambient pressure as the external pressure measurement at a higher accuracy range than a lower accuracy range of the first pressure sensor.

3. The vehicular sensor system of claim 1, wherein the second pressure sensor is further configured to detect a change of the external pressure measurement relative to an ambient pressure, and communicate, to the controller or the first pressure sensor, the external pressure measurement based on the change.

4. The vehicular sensor system of claim 1, wherein the controller is configured to communicate via at least one of a controller area network, a flexray network, or an automotive ethernet network, generated by a network device of the vehicle, with the second pressure sensor via one or more other controllers configured to control data to or from the second pressure sensor.

5. The vehicular sensor system of claim 4, wherein the second pressure sensor comprises a manifold air pressure sensor that is coupled to one of the one or more controllers that comprises a manifold controller, or a barometric air pressure sensor that is coupled to one of the one or more controllers that comprises a motor controller, and wherein the first pressure sensor comprises an airbag pressure sensor coupled to an airbag control unit as the controller.

6. The vehicular sensor system of claim 1, wherein the one or more sensor parameters comprise at least one of a capacitance value corresponding to an applied voltage at the plurality of electrodes, a membrane area, a cavity height, or a spring constant of the first pressure sensor based on a repeated measurement of capacitance values corresponding to one or more applied voltages at the plurality of electrodes.

7. The vehicular sensor system of claim 1, wherein the first pressure sensor is further configured to monitor a detection function that normalizes a measured pressure transient to a same range independently of a change in a temperature or an elevation of the first pressure sensor over a mean sea level, and wherein the first pressure sensor or the controller is configured to monitor whether an ambient pressure is within a predefined range to initiate the self-calibration, wherein the ambient pressure is a pressure within the vehicular sensor system, yet external to the first pressure sensor, or is a pressure external to the vehicular sensor system.

8. The vehicular sensor system of claim 1, further comprising:

a measuring component configured to determine one or more capacitance values for the self-calibration that correspond to one or more applied voltages at the plurality of electrodes, based on the displacement of the membrane from the electrostatic force at a first time and a second time of a time differential, or based on measured capacitance value differences between the first pressure sensor and the second pressure sensor, wherein the second pressure sensor includes a second set of sensor parameters matched to the first pressure sensor.

9. The vehicular sensor system of claim 1, wherein the first pressure sensor is located inside a first enclosure of the vehicle, and the second pressure sensor comprises a manifold air pressure sensor, or a barometric air pressure sensor, at a second enclosure of the vehicle located at a different location in the vehicle than the first enclosure.

10. The vehicular sensor system of claim 1, wherein the first pressure sensor is located inside a first enclosure of the vehicle, and the second pressure sensor is located externally to the vehicle.

11. The vehicular sensor system of claim 1, further comprising a plurality of second pressure sensors having a first barometric pressure sensor connected to the controller and a second barometric pressure sensor that is communicatively coupled to the controller via a different controller, wherein, in response to the controller being communicatively disconnected from a first one of the first barometric pressure sensor or the second barometric pressure sensor, the controller is configured to communicate the external pressure measurement from a second one of the first barometric pressure sensor or the second barometric pressure sensor that is different from the first one of the first barometric pressure sensor or the second barometric pressure sensor.

12. The vehicular sensor system of claim 11, wherein the first barometric pressure sensor is located on a same circuit board or a same substrate of the controller as part of an airbag control network, and the second barometric pressure sensor is located externally to the same circuit board or the same substrate and coupled to the different controller as part of a different control network of the vehicle.

13. The vehicular sensor system of claim 1, wherein the self-calibration component of the first pressure sensor is further configured to generate the self-calibration of the one or more sensor parameters by using a reference pressure derived from the external pressure measurement and in response to the first pressure sensor sensing a first pressure and the second pressure sensor sensing a second pressure within a predefined range with respect to one another.

14. A pressure sensor system comprising:

a first pressure sensor comprising:

a plurality of electrodes;

a membrane configured to experience one or more displacements based on one or more electrostatic charges generated by one or more applied voltages, respectively, at the plurality of electrodes to determine a sensed pressure;

a self-calibration component configured to generate a self-calibration of the first pressure sensor to a set of target values of one or more sensor parameters derived from one or more measurements of capacitance values based on the one or more displacements from the one or more applied voltages at the plurality of electrodes and a received reference pressure; and a second pressure sensor that is communicatively coupled to the first pressure sensor and configured to determine the reference pressure and transmit the reference pressure to the self-calibration component for the self-calibration.

15. The pressure sensor system of claim 14, wherein the first pressure sensor is further configured to determine the sensed pressure with a lower accuracy range than the second pressure sensor is configured to determine the reference pressure.

16. The pressure sensor system of claim 14, wherein the second pressure sensor comprises a manifold air pressure sensor or a barometric air pressure sensor, and the first pressure sensor comprises an airbag pressure sensor.

17. The pressure sensor system of claim 14, wherein the first pressure sensor is located inside a first enclosure of a vehicle, and the second pressure sensor is located externally to the vehicle in a diagnostic tester or a transmitter configured to communicate the reference pressure via a wired or a wireless communication link.

18. The pressure sensor system of claim 14, wherein the first pressure sensor is further configured to perform the self-calibration in response to a predetermined time, a predetermined time interval, or a predetermined event being detected.

19. The pressure sensor system of claim 14, wherein the one or more sensor parameters comprise a process parameter, a membrane area of the membrane, a spring constant of the membrane, and a distance between the plurality of electrodes.

20. A method for a sensor system comprising:
generating one or more displacements of a first membrane of a first pressure sensor based on one or more electrostatic forces, respectively, to determine a first pressure;
receiving, via a second pressure sensor, a sensor data indicating a second pressure; and
facilitating a self-calibration of one or more sensor parameters of the first pressure sensor to one or more target values based on the determined first pressure and the second pressure from the second pressure sensor wherein the self-calibration further comprises:
deriving the one or more sensor parameters of the first pressure sensor from one or more capacitance values corresponding to the one or more electrostatic forces due to one or more applied voltages at a plurality of electrodes of the first pressure sensor, and
utilizing the second pressure as a reference pressure and the one or more sensor parameters to self-calibrate the first pressure sensor to the one or more target values.

21. The method of claim 20, wherein the self-calibration further comprises self-calibrating the one or more sensor parameters by the first pressure sensor to the one or more target values independent of the first pressure, wherein the second pressure comprises an ambient pressure derived from the second pressure sensor.

22. The method of claim 20, wherein receiving the sensor data further comprises a controller coupled to the first pressure sensor communicating with a different controller coupled to the second pressure sensor, wherein the first pressure sensor comprises an air bag sensor and the second pressure sensor comprises a barometric air pressure sensor or a manifold air pressure sensor.

23. The method of claim 20, further comprising:
determining, via the second pressure sensor, the second pressure based on a higher accuracy than the first pressure sensor determines the first pressure.

24. The method of claim 20, further comprising:
monitoring, via a controller or the first pressure sensor, whether an ambient pressure is within a predefined range to initiate the self-calibration of the first pressure sensor.

* * * * *